(12) United States Patent
Langseth et al.

(10) Patent No.: US 12,353,586 B2
(45) Date of Patent: *Jul. 8, 2025

(54) SECURE ENCRYPTED IDENTIFIER DATA SHARING

(71) Applicant: Snowflake Inc., Bozeman, MT (US)

(72) Inventors: Justin Langseth, Kailua, HI (US); Michael Earle Rainey, Kennewick, WA (US); William L. Stratton, Jr., Atlanta, GA (US)

(73) Assignee: Snowflake Inc., Bozeman, MT (US)

( * ) Notice: Subject to any disclaimer, the term of this patent is extended or adjusted under 35 U.S.C. 154(b) by 43 days.

This patent is subject to a terminal disclaimer.

(21) Appl. No.: 18/162,709

(22) Filed: Jan. 31, 2023

(65) Prior Publication Data

US 2023/0169203 A1 Jun. 1, 2023

Related U.S. Application Data

(63) Continuation of application No. 17/664,135, filed on May 19, 2022, which is a continuation of application No. 17/390,938, filed on Jul. 31, 2021, now Pat. No. 11,347,886.

(60) Provisional application No. 63/216,888, filed on Jun. 30, 2021.

(51) Int. Cl.
G06F 16/9535 (2019.01)
G06F 16/27 (2019.01)
G06F 21/62 (2013.01)
H04L 9/40 (2022.01)
H04L 9/06 (2006.01)

(52) U.S. Cl.
CPC .......... G06F 21/6227 (2013.01); G06F 16/27 (2019.01); G06F 16/9535 (2019.01); H04L 63/0421 (2013.01); H04L 9/0643 (2013.01)

(58) Field of Classification Search
CPC .. G06F 21/6227; G06F 16/27; G06F 16/9535; H04L 63/0421; H04L 9/0643
See application file for complete search history.

(56) References Cited

U.S. PATENT DOCUMENTS

| | | | |
|---|---|---|---|
| 9,087,212 B2 * | 7/2015 | Balakrishnan | G06F 21/6227 |
| 9,311,500 B2 * | 4/2016 | Roth | H04L 9/3226 |
| 10,153,897 B1 | 12/2018 | Jezewski | |
| 10,789,373 B2 | 9/2020 | Reid et al. | |
| 11,347,886 B1 | 5/2022 | Langseth et al. | |

(Continued)

FOREIGN PATENT DOCUMENTS

JP 2021-22945 A * 2/2021 ........... G06F 21/602

OTHER PUBLICATIONS

U.S. Appl. No. 17/390,938 U.S. Pat. No. 11,347,886, filed Jul. 31, 2021, Secure Multi-Party Encrypted Identifier Data Sharing.

(Continued)

Primary Examiner — Ken Hoang
(74) Attorney, Agent, or Firm — Schwegman Lundberg & Woessner, P.A.

(57) ABSTRACT

Embodiments of the present disclosure may provide a data clean room allowing encryption based data analysis across multiple accounts, including different provider database user accounts that provide user data and a network service and a requesting user that generates one or more clean room requests. The data clean room may also restrict which data may be used in the analysis and may restrict the output.

21 Claims, 13 Drawing Sheets

(56) References Cited

U.S. PATENT DOCUMENTS

| | | | |
|---|---|---|---|
| 2015/0149362 A1 | 5/2015 | Baum et al. | |
| 2015/0309980 A1* | 10/2015 | Glass | G06F 9/543 |
| | | | 715/219 |
| 2018/0196955 A1 | 7/2018 | Dageville et al. | |
| 2020/0042734 A1* | 2/2020 | Lee | G06F 21/6227 |
| 2020/0304507 A1 | 9/2020 | Pandey et al. | |
| 2021/0243018 A1 | 8/2021 | Jacobs et al. | |
| 2021/0319128 A1* | 10/2021 | Salomon | G06F 21/6218 |
| 2022/0019479 A1* | 1/2022 | Hankinson | G06F 9/5072 |
| 2023/0004670 A1 | 1/2023 | Langseth et al. | |

OTHER PUBLICATIONS

U.S. Appl. No. 17/664,135, filed May 19, 2022, Secure Multi-Party Encrypted Identifier Data Sharing.

"U.S. Appl. No. 17/390,938, Non Final Office Action mailed Nov. 24, 2021", 15 pgs.

"U.S. Appl. No. 17/390,938, Notice of Allowance mailed Mar. 29, 2022", 8 pgs.

"U.S. Appl. No. 17/390,938, Preliminary Amendment Filed Aug. 5, 2021", 9 pgs.

"U.S. Appl. No. 17/390,938, Response filed Feb. 24, 2022 to Non Final Office Action mailed Nov. 24, 2021", 11 pgs.

"U.S. Appl. No. 17/664,135, Final Office Action mailed Nov. 18, 2022", 29 pgs.

"U.S. Appl. No. 17/664,135, Non Final Office Action mailed Jul. 21, 2022", 26 pgs.

"U.S. Appl. No. 17/664,135, Response filed Oct. 20, 2022 to Non Final Office Action mailed Jul. 21, 2022", 14 pgs.

Thilakanathan, Danan, et al., "Secure and Controlled Sharing of Data in Distributed computing", 2013 IEEE 16th International Conference on Computational Science and Engineering, (Dec. 2013), 2 pgs.

"U.S. Appl. No. 17/664,135, Response filed Feb. 21, 2023 to Final Office Action mailed Nov. 18, 2022", 13 pgs.

"U.S. Appl. No. 17/664,135, Final Office Action mailed Feb. 15, 2024", 13 pgs.

"U.S. Appl. No. 17/664,135, Non Final Office Action mailed Oct. 18, 2023", 13 pgs.

"U.S. Appl. No. 17/664,135, Response filed Jan. 18, 2024 to Non Final Office Action mailed Oct. 18, 2023", 10 pgs.

"U.S. Appl. No. 17/664,135, Response filed Sep. 18, 2023 to Non Final Office Action mailed Jun. 16, 2023", 10 pgs.

"U.S. Appl. No. 17/664,135, Response filed Nov. 26, 2024 to Non Final Office Action mailed Aug. 28, 2024", 9 pgs.

"U.S. Appl. No. 17/664,135, Non Final Office Action mailed Aug. 28, 2024", 14 pgs.

"U.S. Appl. No. 17/664,135, Response filed May 15, 2024 to Final Office Action mailed Feb. 15, 2024", 10 pgs.

* cited by examiner

SECURE ENCRYPTED IDENTIFIER DATA SHARING

CROSS-REFERENCE TO RELATED APPLICATIONS

This application is a Continuation of U.S. patent application Ser. No. 17/664,135, filed May 19, 2022, which is a Continuation of U.S. patent application Ser. No. 17/390,938 Jul. 31, 2021, which claims the benefit of priority to U.S. Provisional Patent Application Ser. No. 63/216,888, filed Jun. 30, 2021, the contents of which are hereby incorporated by reference in their entireties.

TECHNICAL FIELD

The present disclosure generally relates to securely analyzing data using a data clean room of a distributed database.

BACKGROUND

Currently, most digital advertising is performed using third-party cookies. Cookies are small pieces of data generated and sent from a web server and stored on the user's computer by the user's web browser that are used to gather data about customers' habits based on their website browsing history. Because of privacy concerns, the use of cookies is being restricted. Companies may want to create target groups for advertising or marketing efforts for specific audience segments. To do so, companies may want to compare their customer information with that of other companies to see if their customer lists overlap for the creation of such target groups. Thus, companies may want to perform data analysis, such as an overlap analysis, of their customers or other data.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
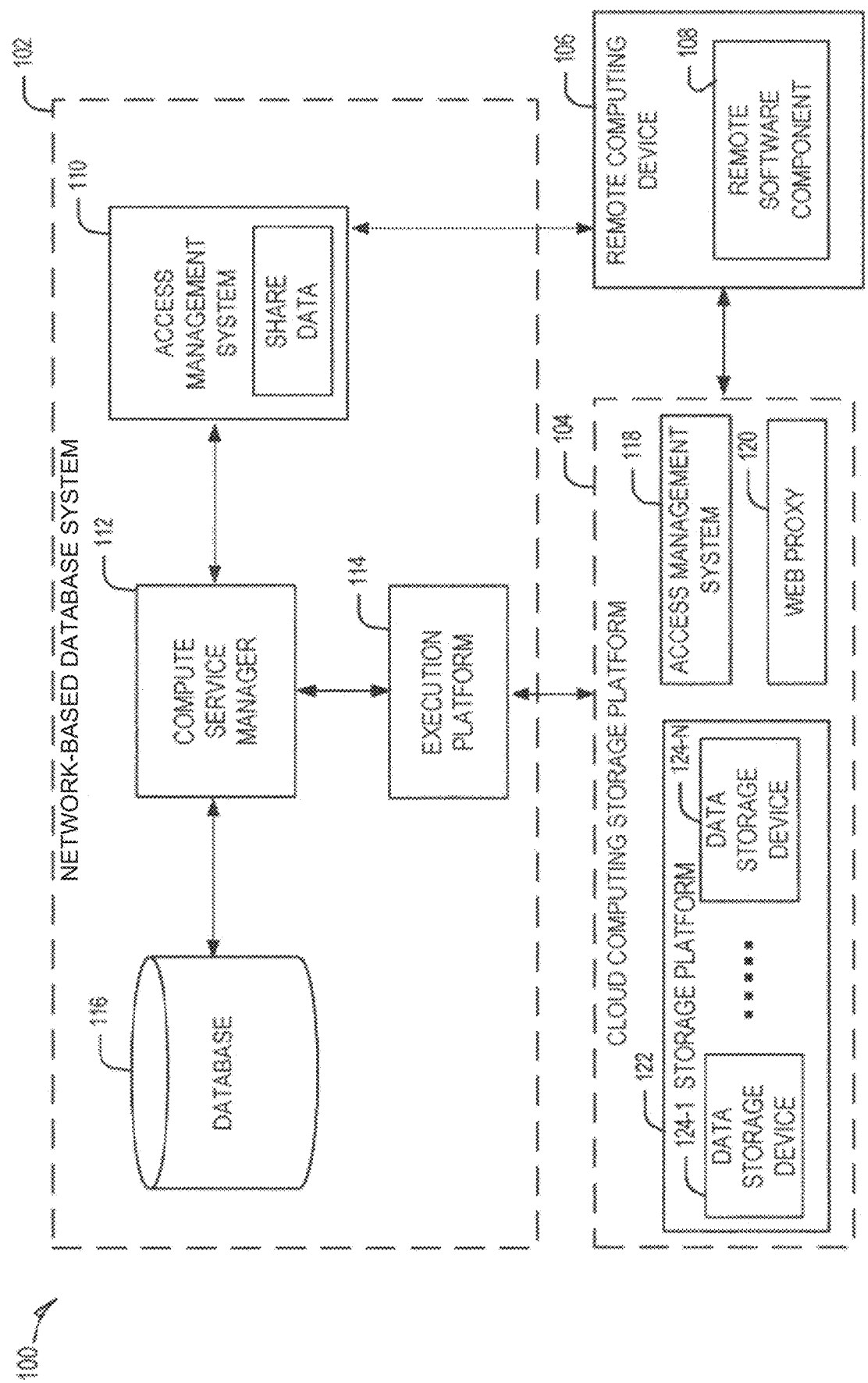
FIG. 1 illustrates an example computing environment in which a network-based database system can data clean rooms, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, it can be difficult to securely and efficiently share data between data stores of different entities. To this end, an encryption based data clean room can be implemented that performs direct matching of data (e.g., user IDs) in the different data sets in an encryption-based approach using shared functions and shared data objects, in accordance with some example embodiments. As an example, a requester database account can seek to perform overlap analysis with data of another account, e.g., user data of a provider database account. For example, the overlap analysis may require matching user identifiers (e.g., user IDs, emails) for users shared by the requestor and provider database accounts. To this end, and in accordance with some example embodiments, the provider database account can generate available values that the provider will include in a given query without exposing the underlying data. For instance, the provider can specify that a zip-code column of its user data can be included as part of the requester's query (e.g., referenced by a condition in a SELECT). Further, the requestor account specifies which of the requester's data is to be included in a given query (e.g., columns, and/or rows) and encrypts this data using a key that is kept private to the requester. The provider account can further generate a secure sharable function that is configured to perform direct matching when called (e.g., by the requester), where the function is configured to accept as input a decrypt key. The requestor can receive shared access to the function and run the function on the requester's encrypted data (e.g., using compute instances managed by the requester account), where the requester inputs the decrypt key to the shared function when initiated to perform direct matching of overlapping data between the data sets and to generate results data in a secure encryption-based approach.

Further, the encryption based data clean room can be implemented to share data between multiple entities, such as between a requester account and a plurality of different provider accounts. In some example embodiments, the encryption based data clean room wraps encryption functions from the different provider accounts around a requester's encryption function such that direct encryption based matching can be performed by the encryption based data clean room without exposing the different provider's data to each other and the requester.

FIG. 1 illustrates an example shared data processing platform 100 implementing secure messaging between deployments, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a network-based database system is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can an application that a data provider (e.g., provider database account) or data consumer (e.g., requester database account) implement to interact with the network-based database system 102 (e.g., a browser that creates active sessions with network services of the network-based database system 102 or cloud computing storage platform 104).

The network-based database system 102 comprises an access management system 110, a compute service manager 112, an execution. platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored. on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled. to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-n that are part of a cloud computing storage platform 104. In some embodiments, data storage devices 124-1 to 124-n are cloud-based storage devices located in one or more geographic locations. For example, data storage devices 124-1 to 124-n may be part of a public cloud infrastructure or a private cloud infrastructure. Data storage devices 124-1 to 124-n may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-n supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and. may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
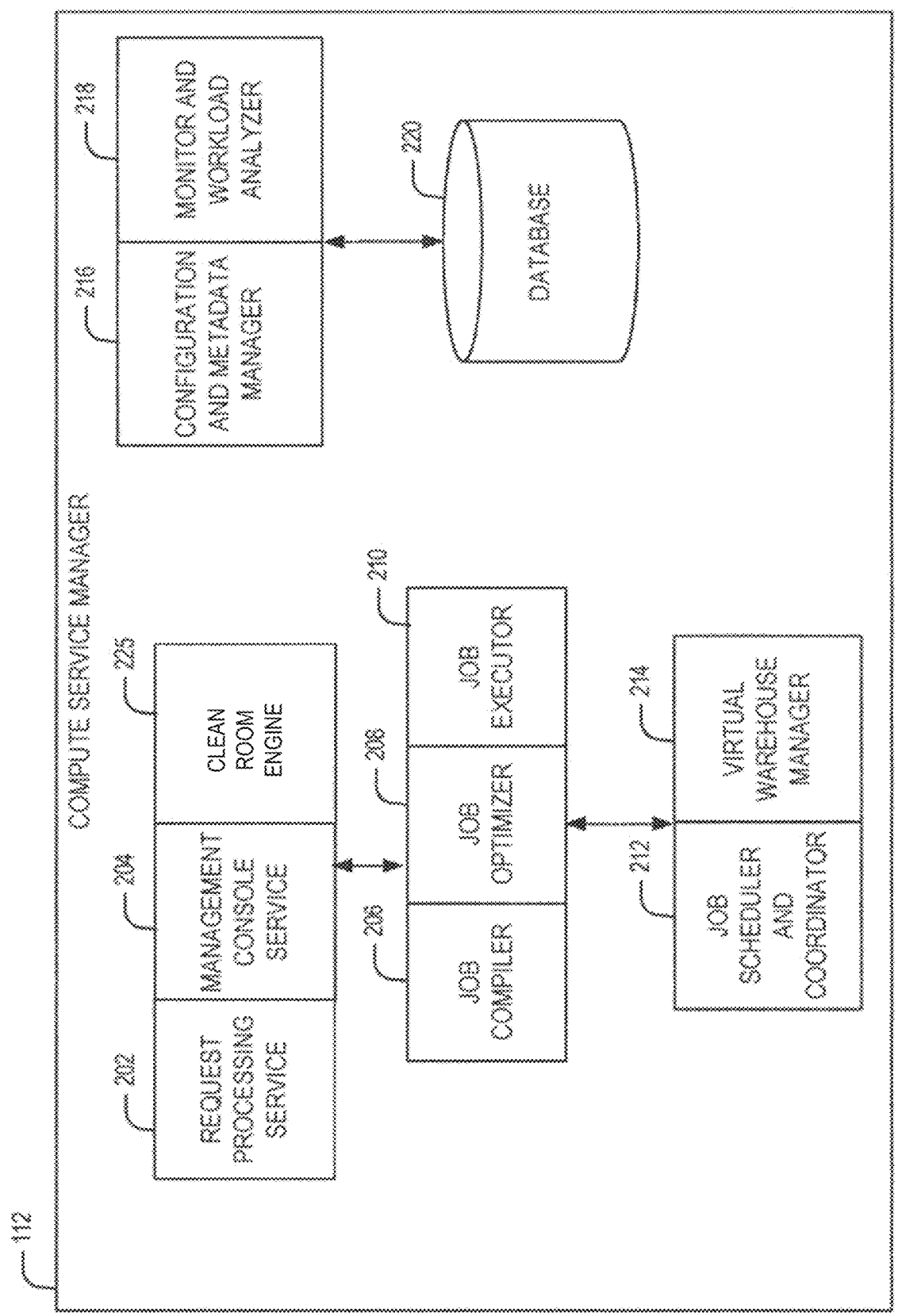
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The clean room engine 225 manages performing secure queries on a data set shared by a plurality of database accounts (e.g., a requesting or consumer database account that generates the request, and a provider database account that shares user defined functions to complete the request), as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
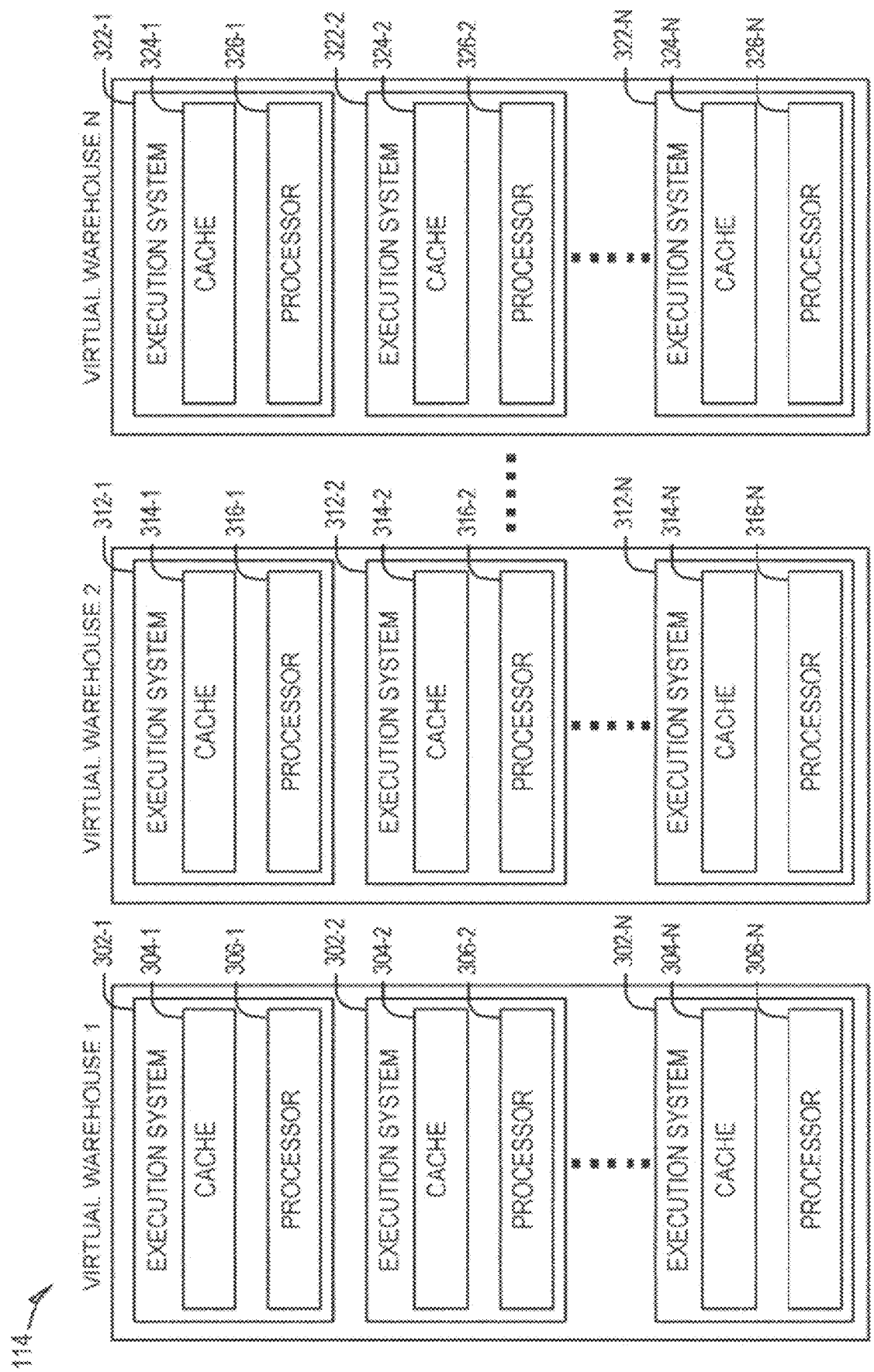
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-i includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data. storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to sonic example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may he further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different, entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-*n* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
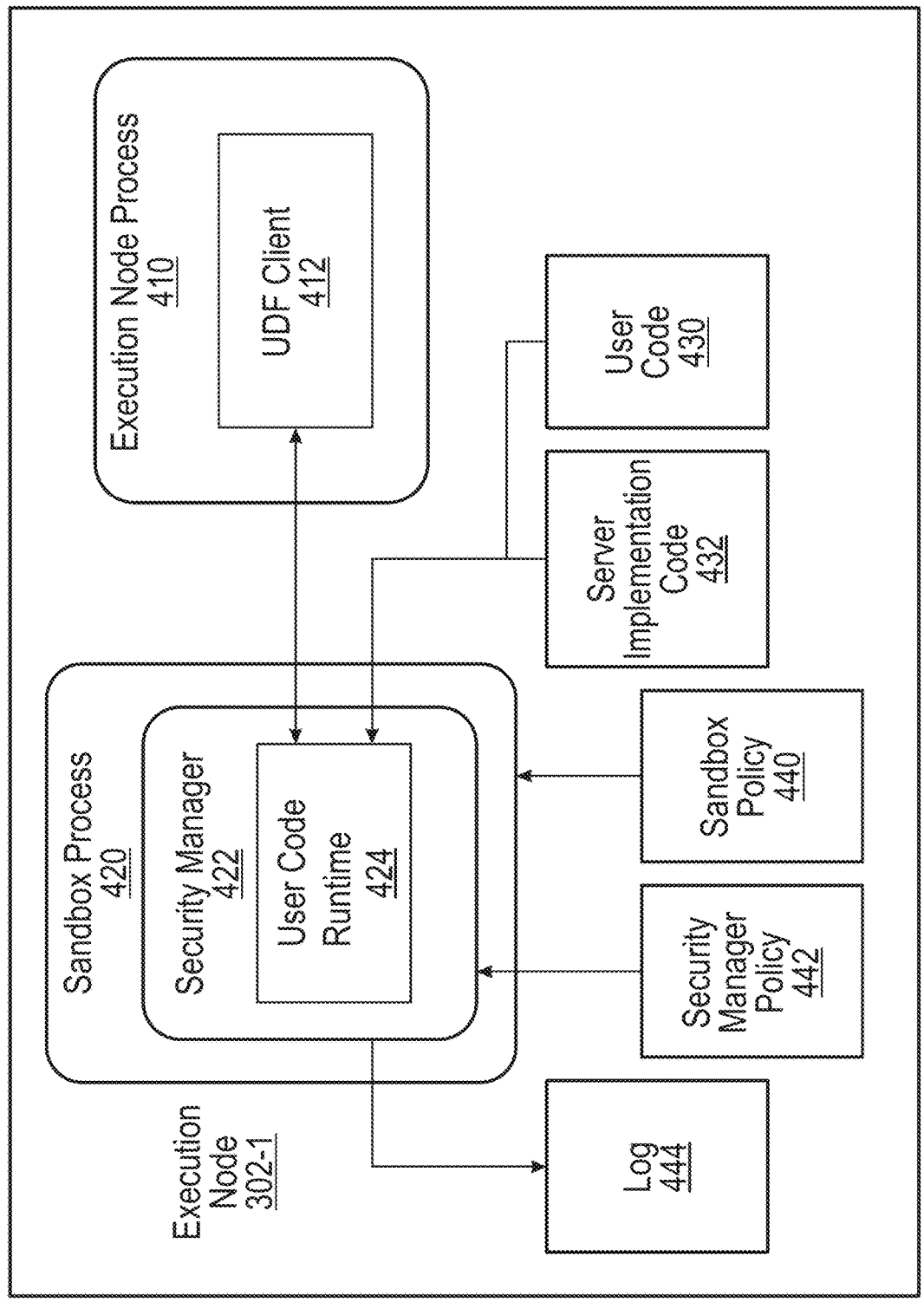
FIG. 4 is a computing environment conceptually illustrating an example software architecture executing a user defined function (UDF) by a process running on a given execution node of the execution platform, according to some example embodiments.

FIG. 4 is a computing environment 400 conceptually illustrating an example software architecture executing a user defined function (UDF) by a process running on a given execution node of the execution platform 114, in accordance with some embodiments of the present disclosure. As illustrated, the execution node 302-1 from the execution platform 114 includes an execution node process 410, which in an embodiment is running on the processor 3064 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 112 validates all communication from the execution platform 114 to validate that the content and context of that communication are consistent with the task(s) known to be assigned to the execution platform 114. For example, the execution platform 114 executing a query A is not allowed to request access to a particular data source (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve security of the computing environment 400 by using a different codebase (e.g., one without the same or fewer potential security exploits)

User code 430 may be provided as a package e.g., in the form of a JAR (JAVA archive) file which includes code for one or more UDFs. Server implementation code 432, in an embodiment, is a JAR file that initiates a server which is responsible for receiving requests from the execution node process 410, assigning worker threads to execute user code, and returning the results, among other types of server tasks.

In an implementation, an operation from a UDF can be performed by a user code runtime 424 executing within a sandbox process 420. In an embodiment, the user code runtime 424 is implemented as a virtual machine, such as a JAVA virtual machine (JVM). Since the user code runtime 424 advantageously executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node 302-1, or at a separate location such as the storage platform 104. Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa) with the aforementioned advantages described above.

Security Manager 422, in an example, can prevent completion of an operation from a given UDF by throwing an exception (e.g., if the operation is not permitted), or returns (e.g., doing nothing) if the operation is permitted. In an implementation, the Security Manager 422 is implemented as a JAVA security manager object that allows applications to implement a security policy such as a security manager policy 442, and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of entrusted. applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., object oriented programming language), it is appreciated. that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

Figure 5:
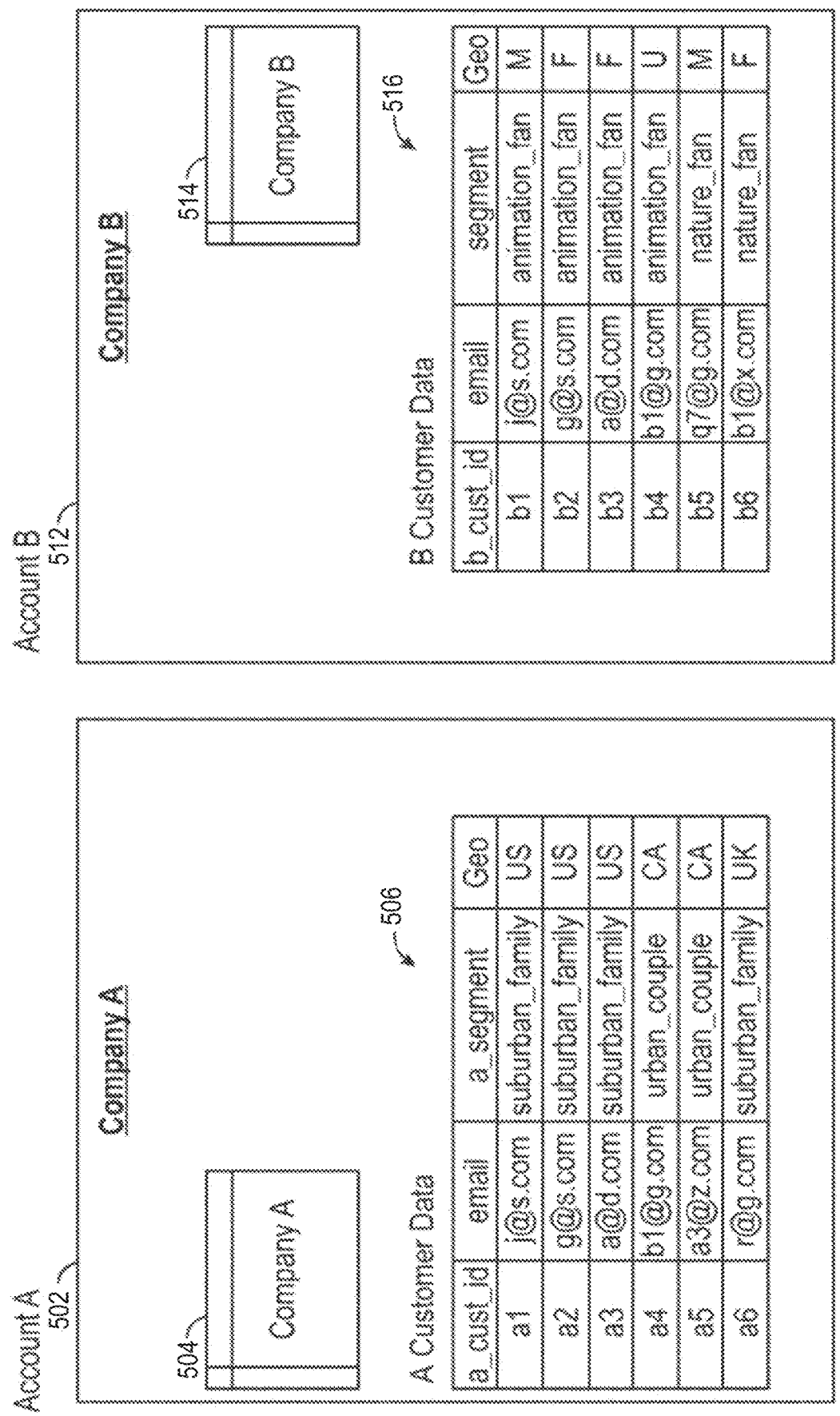
FIG. 5 shows an example of two separate accounts in a data warehouse system, according to some example embodiments.

FIG. 5 shows an example of two separate accounts in a data warehouse system, according to some example embodiments. Here, Company A may operate an account A 502 with a network-based data warehouse system as described herein. In account A 502, Company A data 504 may be stored. The Company A data 504 may include, for example, customer data 506 relating to customers of Company A. The customer data 506 may be stored in a table or other format storing customer information and other related information. The other related information may include identifying information, such as email, and other known characteristics of the customers, such as gender, geographic location, purchasing habits, and the like. For example, if Company A is a consumer-goods company, purchasing characteristics may be stored, such as whether the customer is single, married, part of a suburban or urban family, etc. If Company A is a streaming service company, information about the watching habits of customers may be stored, such as whether the customer likes sci-fi, nature, reality, action, etc.

Likewise, Company B may operate an account B 512 with the network-based database system as described herein. In account B 512, Company B data 514 may be stored. The Company B data 514 may include, for example, customer data relating to customers of Company B. The customer data 516 may be stored in a table or other format storing customer information and other related information. The other related information may include identifying information, such as email, and other known characteristics of the customers, such as gender, geographic location, purchasing habits, etc., as described above.

For security and privacy reasons, Company A's data may not be accessible to Company B and vice versa. However, Company A and Company B may want to share at least some of their data with each other without revealing sensitive information, such as a customer's personal identity information. For example, Company A and Company B may want to explore cross marketing or advertising opportunities and may want to see how many of their customers overlap and filter based on certain characteristics of the overlapping customers to identify relationships and patterns.

Figure 6:
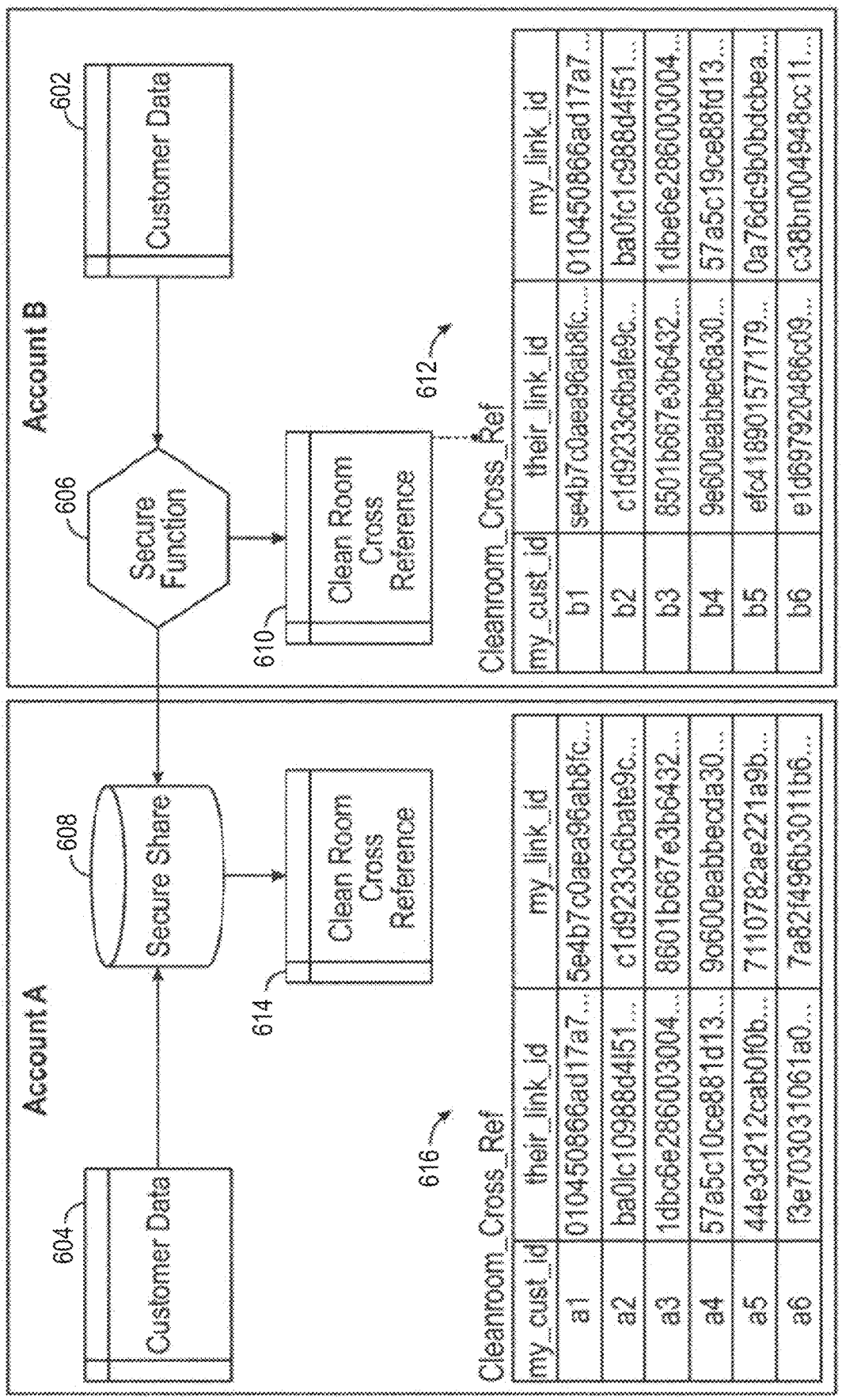
FIG. 6 is a block diagram illustrating a method for operating a data clean room, according to some example embodiments.

To this end, a data clean room may be provided by the network-based database system as described herein. FIG. 6 is a block diagram illustrating a method for operating a data clean room, according to some example embodiments. The data clean room may enable companies A and B to perform overlap analysis on their company data, without sharing sensitive data and without losing control over the data. The data clean room may create linkages between the data for each account and may include a set of blind cross reference tables.

Next, example operations to create the data clean room are described. Account B may include customer data 602 for Company B, and account A may include customer data 604 for Company A. In this example, account B may initiate the creation of the data clean room; however, either account may initiate creation of the data clean room. Account B may create a secure function 606. The secure function 606 may look up specific identifier information in account B's customer data 602. The secure function 606 may anonymize the information by creating identifiers for each customer data (e.g., generating a first result set). The secure function 606 may be a secure user-defined function (e.g., database UDF that operates on tables UDTF, a java UDF that opens a Jar file to execute one or more java functions to return data).

The secure function 606 may be implemented as a SQL UDF. The secure function 606 may be defined to protect the underlying data used to process the function. As such, the secure function 606 may restrict direct and indirect exposure of the underlying data.

The secure function 606 may then be shared with account A using a secure share 608. The secure share 608 may allow account A to execute the secure function 606 while restricting account A from having access to the underlying data of account B used by the function and from being able to see the code of the function. The secure share 608 may also restrict account A from accessing the code of the secure function 606. Moreover, the secure share 608 may restrict account A from seeing any logs or other information about account B's use of the secure function 606 or the parameters provided by account B of the secure function 606 when it is called.

Account A may execute the secure function 606 using customer data 604 (e.g., generating a second result set). The result of the execution of the secure function 606 may be communicated to account B. For instance, a cross reference table 610 may be created in account B, which may include anonymized customer information 612 (e.g., anonymized identification information, private salted by provider's secret salt, or via encryption as discussed below with reference to FIGS. 7A-10). Likewise, a cross reference table 614 may be created in account A, which may include anonymized customer information 616 for matching overlapping customers for both companies, and dummy identifiers for non-matching records. The data from the two companies may be securely joined so that neither account may access the underlying data or other identifiable information.

For instance, cross reference table 610 (and anonymized customer information 612) may include fields: "my_cust_id," which may correspond to the customer ID in account B's data; "my_link_id," which may correspond to an anonymized link to the identified customer information; and a "their_link_id," which may correspond to an anonymized matched customer in company A. "their_link_id" may be anonymized. (e.g., salted), so that company B cannot discern the identity of the matched customers. The anonymization may be performed using hashing, encryption, tokenization, or other suitable techniques.

Moreover, to further anonymize the identity, all listed customers of company B in cross reference table 610 (and anonymized customer information 612) may have a unique matched customer from company B listed, irrespective of whether there was an actual match or not. A dummy "their_link_id" may be created for customers not matched. This way neither company may be able to ascertain identity information of the matched customers. Neither company may discern where there is an actual match rather than a dummy returned identifier (no match). Hence, the cross reference tables 610 may include anonymized key-value pairs. A summary report may be created notifying the total number of matches, but other details of the matched customers may not be provided to safeguard the identities of the customers.

Figure 7A:
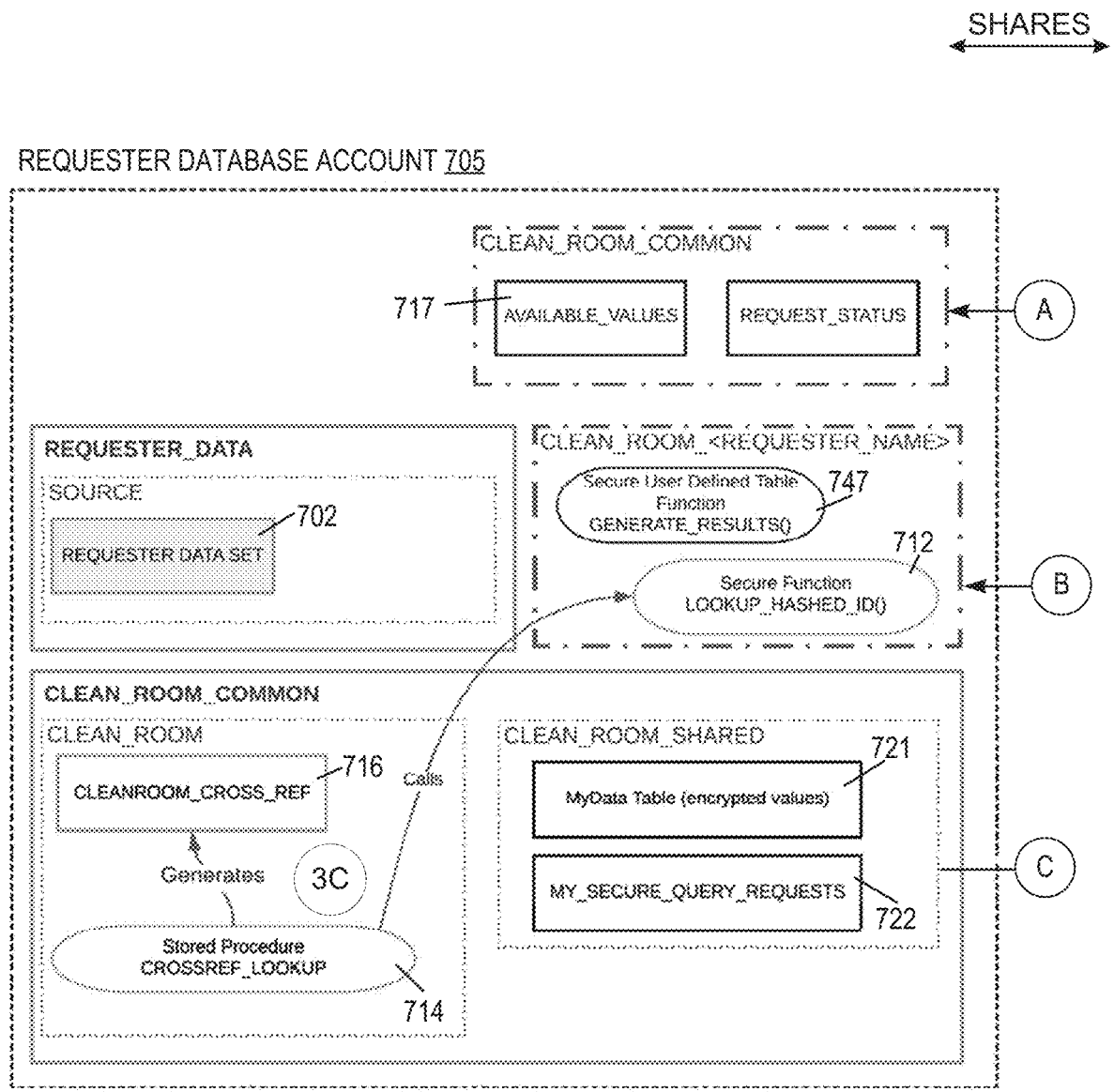
FIGS. 7A and 7B a secure encryption-based clean room architecture, according to some example embodiments.
Figure 7B:
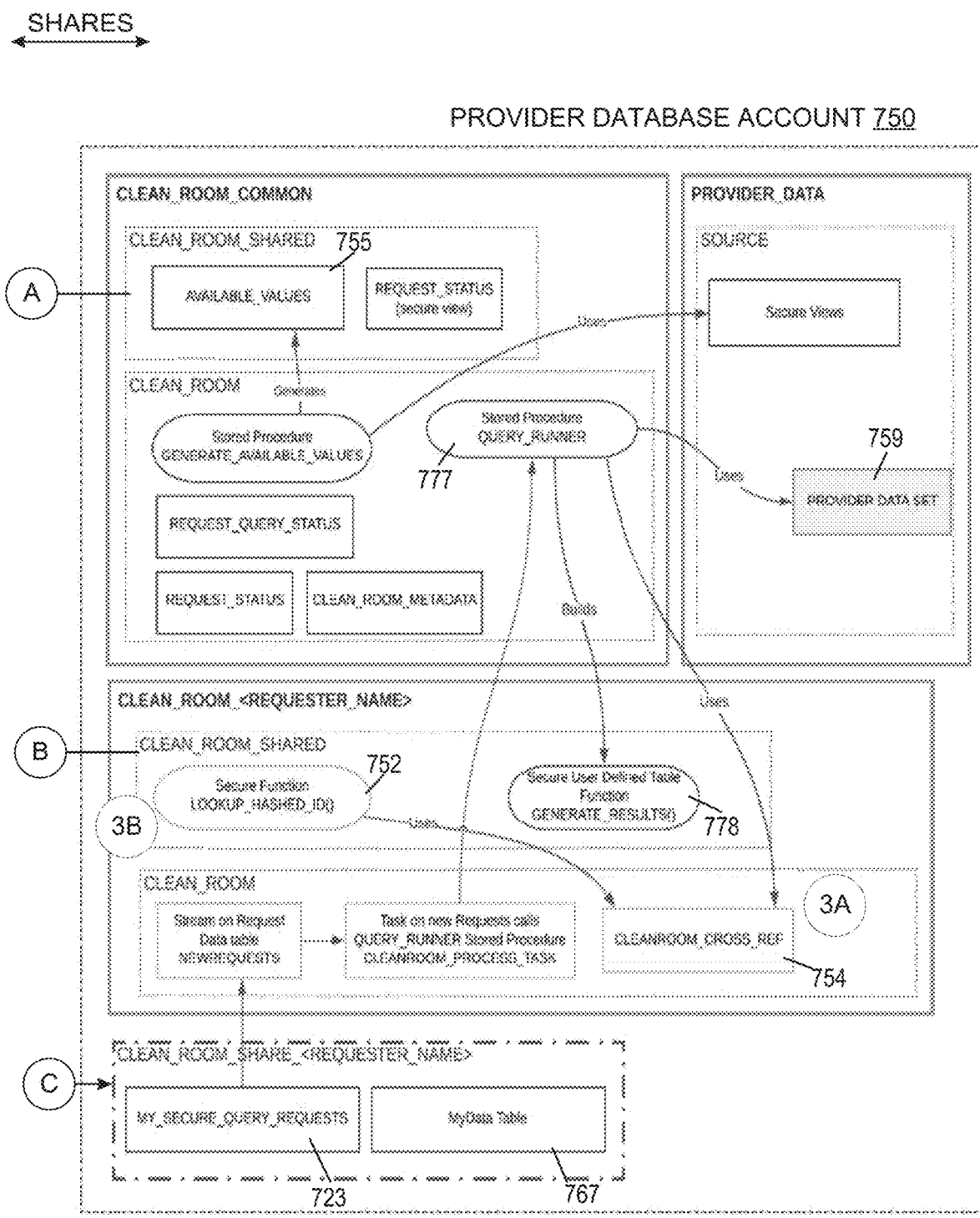

FIGS. 7A and 7B show a secure encryption-based clean room architecture, according to some example embodiments. In the example illustrated, Requester Database Account 705 is shown in FIG. 7A and the Provider Database Account 750 is shown in FIG. 7B, and. data transferred between the accounts is shared (e.g., via metadata pointers), as indicated by the double-side arrows at the top of FIGS. 7A and 7B, and the disconnected A, B, and C arrows at the sides of FIGS. 7A and 7B. With reference to the Requester Database Account 705 in FIG. 7A, the requester data set 702 comprises requester-specific data to be used in clean room requests, according to some example embodiments. With reference to the Provider Database Account 750 in FIG. 7B, the provider data set 759 comprises provider-specific data to be used in clean mom requests, according to some example embodiments. The data flows 3A, 3B, and 3C are optional, in accordance with some example embodiments, and can be implemented. to perform complex join queries. For example, in queries that require complex joining of one or more tables, encrypting the data may be impractical to join, and. as such the data flows 3A, 3B, and 3C can be implemented instead to perform joins on unencrypted data.

With reference to Provider Database Account 750 in FIG. 7B, at data flow 3A, the Provider Account Cleanroom Cross Reference Table 754 is generated by the Provider Database Account 750, which stores the Provider ID(s) hashed with a private salt, that is private to the Provider Database Account 750. At data flow 3B (in FIG. 7B), a Secure Hash Lookup Function 752 is created and shared from the Provider Database Account 750 to the Requester Database Account 705 as a Shared Secure Hash Lookup Function 712 (FIG. 7A) to enable lookup of hashed IDs from the Provider Account Cleanroom Cross Reference Table 754.

With reference to the data flow 3C in FIG. 7A, the Requester Database Account 705 calls the Shared Secure Hash Lookup Function 712 ("Secure Function Lookup_Hashed_ID( )") using a Stored Procedure 714 ("CrossRef Lookup"), which generates the requester's Cross Reference Table 716 in the Requester Database Account 705.

With reference to Provider Database Account 750 of FIG. 7B, the Available Values Table 755 is created by the Provider Database Account 750, which is then shared with the Requester Database Account 705 as Available Values Table 717 (in FIG. 7A). The Available Values table 755 specifies data from the Provider Data Set 759 to which the Requester Database Account 705 has access (e.g., referenced by a WHERE in a. SELECT query from the requester). That is, the Available Values Table 755 species which parts of a provider's data can be used in a given Requester's query (e.g., SQL select statements), or used as filters in a given clean room request when the given clean room request is generated by the Requester Database Account 705. For example, the Provider may specify in the Available Values Table 755 one or more columns or rows of the Provider Data Set 759 that can be included in a Requester's query (e.g., reference in a SELECT statement of the requester query), and any columns or rows not in the Available Values Table 755 (e.g., customer social security numbers) or rows (e.g., subsets of customer data of customer's under 18 years old) are not includable in the requester's clean room requests.

In FIG. 7A, the Requester Database Account 705, prior to generating a request, can generate the My Data Table 721, which functions as a pre-filters for the final results data by sharing encrypted data of columns or rows (from the requester data set 702) that are to be used in a given clean room request from the Requester Database Account 705 (where data not included. in the My Data Table 721 are not used in the query, nor are matched or otherwise correlated with the Provider's data). The Requester ID(s) (e.g., customer emails) will be encrypted. and included in the My Data Table 72, in accordance with some example embodiments. In some example embodiments, the encrypted data is encrypted using a pass phrase, e.g., in AES-256 based encryption. In accordance with sonic example embodiments, a clean room request is created when the Requester Database Account 705 inserts query data (e.g., clean room request) into the My Secure Query Requests Table 722 which is then shared as My Secure Query Requests Table 723 in the Provider Database Account 750. As an example, the inserted request data can include: select/group by columns and filter parameters, which can specify data fields (e.g., columns) from both the Requester Database Account 705 and the Provider Database Account 750 to be correlated and processed to generate final results for that given query.

With reference to the Requester Database Account 705, upon a request being inserted into the My Secure Query Requests Table 722, the query data is shared with the Provider Database Account 750 as in the My Secure Query Requests Table 723. The Query Runner Stored Procedure 777 accepts the new request, validates it against the Available Values Table 755 of the Provider Database Account 750, applies any restrictions or thresholds (e.g., rejects or removes data not accessible per the Available Values Table 755), and the Provider Database Account 750 builds a Secure User Defined Table Function 778 (UDTF, e.g., "Secure User Defined Table Function Generate Results( )") as a share-able function that is call-able by others (e.g., the Requester, to run on the requester's compute instances via secure sandbox processes) who can pass in data (the key) and run the function from a client of an execution node of the requestor in secure sandbox processes (e.g., via sandbox process 420), as discussed above with reference to FIG. 4.

Whereas in the cross reference table approach, discussed above, performs pre-matching of hashed and cross referenced data to correlate user IDs that match in the respective data sets (e.g., matching mails in. requester and provider data sets), the Secure User Defined Table Function 778 is a shareable secure function that accepts a decrypt key (as a parameter or input to the function upon the function being called, e.g., by the requester for a given clean room query).

In accordance with some example embodiments, anytime the Secure User Defined Table Function 778 performs a join or otherwise references a given column of the My Data Table 767, the Secure User Defined Table Function 778 is configured to wrap a decryption function around the joined or referenced data (e.g., columns specified in the query), where the function is configured to use an function input that is to be input by the requester (e.g., input decrypt pass phrase input by the requestor) as a decryption key to access the requesters user ID (e.g., user email) in plain text, which can then matched against the provider's data set (e.g., a matching email) in the sandbox processes of the Secure User Defined Table Function 778 (to run the UDF on the requestors compute instances). The Secure User Defined Table Function 778 thus works as a query that joins the two sets of data together (the provider and requester user IDs or emails that match), based on a given identifier (a customer having accounts in the requester's data and the provider's data). In this way, the Query Runner Stored Procedure 777 creates the Secure User Defined Table Function 778 to directly match the IDs of the Requester Database Account 705 to the IDs of the Provider Database Account 750, directly, without using the cross reference table. Although as discussed, in some example embodiments, if the data clean room request is complex, the cross referenced data may be used to perform further join operations. An example a pure encryption based data clean room request that does not implement the cross reference approach includes directly matching email to email (or other single, one-to-one identifier based matching) An example of a complex query that may further implement the cross referenced table data includes any join or query processes that requires more than one-to-one matching of identifiers, such as obfuscating each users geographic area (e.g., in those example embodiments, further join or query operations can be performed using the pre-matching approach, and the encryption matching can be implemented using the encryption direct matching).

While the Provider Database Account 750 can view the query (e.g., view the Secure User Defined. Table Function 778, such as view the columns' of the provider that the Requester Database Account 705 is specifying in the query), the Provider Database Account 750 cannot run the Secure User Defined Table Function 778 to generate results since the Provider Database Account 750 does not have the requester's decrypt key to pass in as a function parameter for the Secure User Defined Table Function 778.

The Secure User Defined Table Function 778 is then shared with the Requester Database Account 705 as Shared Secure User Defined Table Function 747 in FIG. 7A. The Requester Database Account 705 then inputs the decryption passphrase as a parameter input to the Shared Secure User Defined Table Function 747 to decrypt and access the data and generate the clean room request results. For example, the Requester Database Account 705 runs the Shared Secure User Defined Table Function 747 on its own commute instances (e.g., FIG. 3) to decrypt the encrypted data in the My Data Table 721 using the pass phrase and accesses portions of the provider's data using shared access (e.g., using metadata pointers, metad.ata stored in data storage device 220, FIG. 2).

Figure 8:
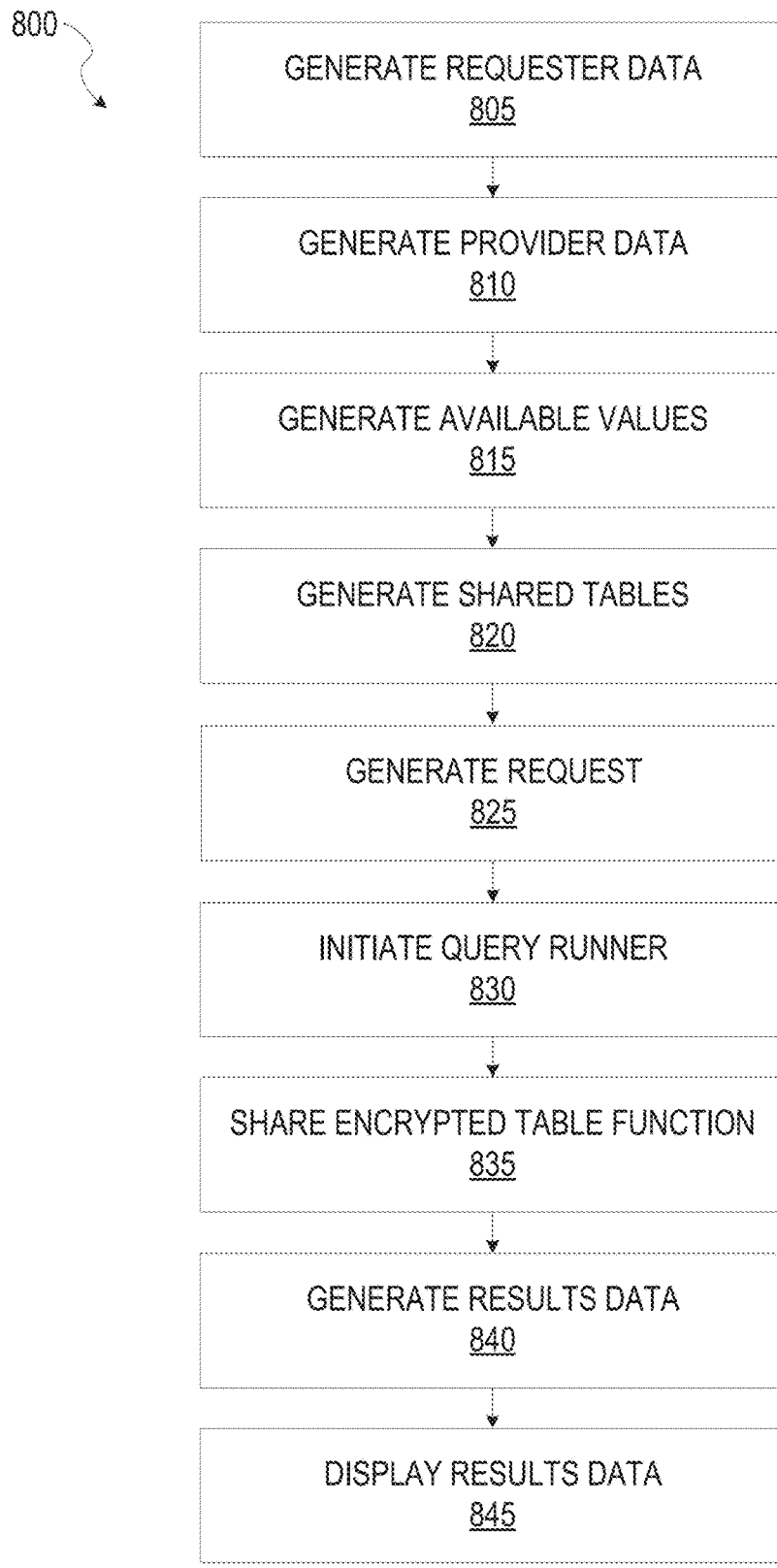
FIG. 8 shows a flow diagram of a method for implementing a secure encryption-based clean room architecture, according to some example embodiments.

FIG. 8 shows a flow diagram of a method 800 for implementing a secure encryption-based clean room architecture, according to some example embodiments. At operation 805, the Requester Database Account 705 generates requester data, such as the requester data set 702 (FIG. 7A). At operation 810, the Provider Database Account 750 generates provider data, such as the provider data set 759 (FIG. 7B) and the Provider Account Cleanroom Cross Reference table 754, for optional complex joins. For example, the encryption-based direct matching can be performed first followed by more complex cross-reference table based joins to generate query data. At operation 815, the Provider Database Account 750 generates and shares which portions of the provider data is accessible in the query, as an available values table 755. At operation 820, the Requester Database Account 705 generates shared tables for use in the clean room queries. For example, the Requester Database Account 705 generates the My Data Table 721 and My Secure Query Requests Table 722 which is shared with the Provider Database Account 750 as My Secure Query Requests Table 723 and My Data Table 767. As discussed, the data of the My Data Table 721 is encrypted with a pass phrase (e.g., AES 256 encryption pass phrase, pass key, encryption key) that is private or secret to the Requester Database Account 705.

At operation 825, the Requester Database Account 705 generates a clean room request. For example, the Requester Database Account 705 inserts a query request into the My Secure Query Requests Table 722, which is shared with the Provider Database Account 750 in My Secure Query Requests Table 723, which initiates the Query Runner Stored Procedure 777 of the Provider Database Account 750.

At operation 830, the Provider Database Account 750 initiates (e.g., runs) the Query Runner Stored Procedure 777 which generates the Secure User Defined Table Function 778, which accepts the decryption key as a parameter. At operation 835, the Provider Database Account 750 shares an encrypted table function. For example, the Provider Database Account 750 shares the Secure User Defined Table Function 778 with the Requester Database Account 705 as Shared Secure User Defined Table Function 747.

At operation 840, the Requester Database Account 705 generates results data by passing the Shared Secure User Defined Table Function 747 the decrypt pass phrase, and the Shared Secure User Defined Table Function 747 (running on compute instances of the Requester Database Account 705) decrypts the requester data and matches it to user IDs in the providers data set 759 which are accessed using metadata references, without exposing the data to the requester database account, in accordance with some example embodiments. In this way, the direct matching occurs when the Requester Database Account 705 calls the Shared Secure User Defined Table Function 747 (as the Provider Database Account 750 cannot execute the function because the provider does not have the encryption pass phrase that is used to encrypt the requester data to generate results data). At operation 845, the results data is displayed (e.g., displays the results data on a display device of the Requester Database Account 705).

Figure 9A:
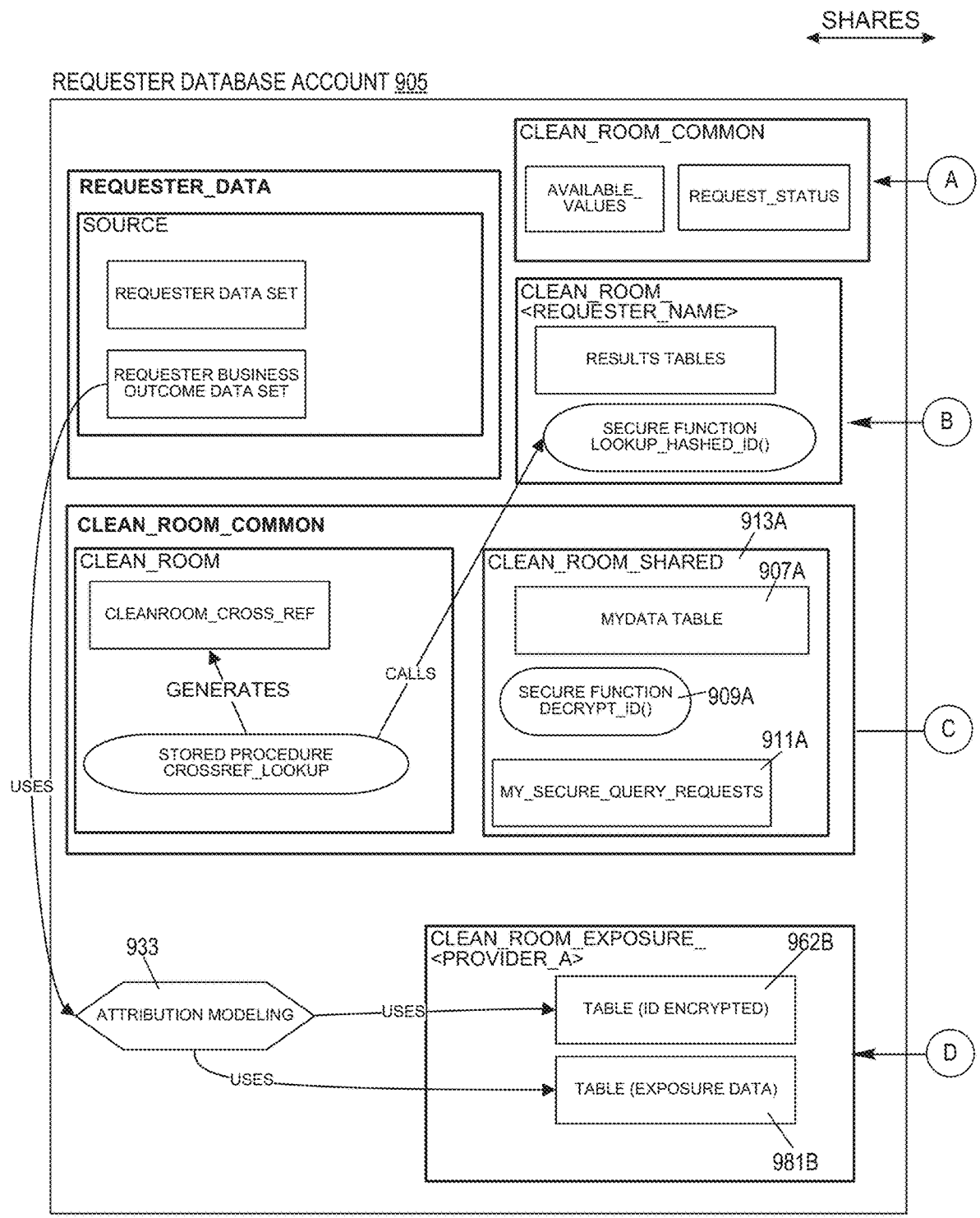
FIGS. 9A and 9B show an example distributed database architecture for implementing multi-entity database clean rooms, according to some example embodiments.
Figure 9B:
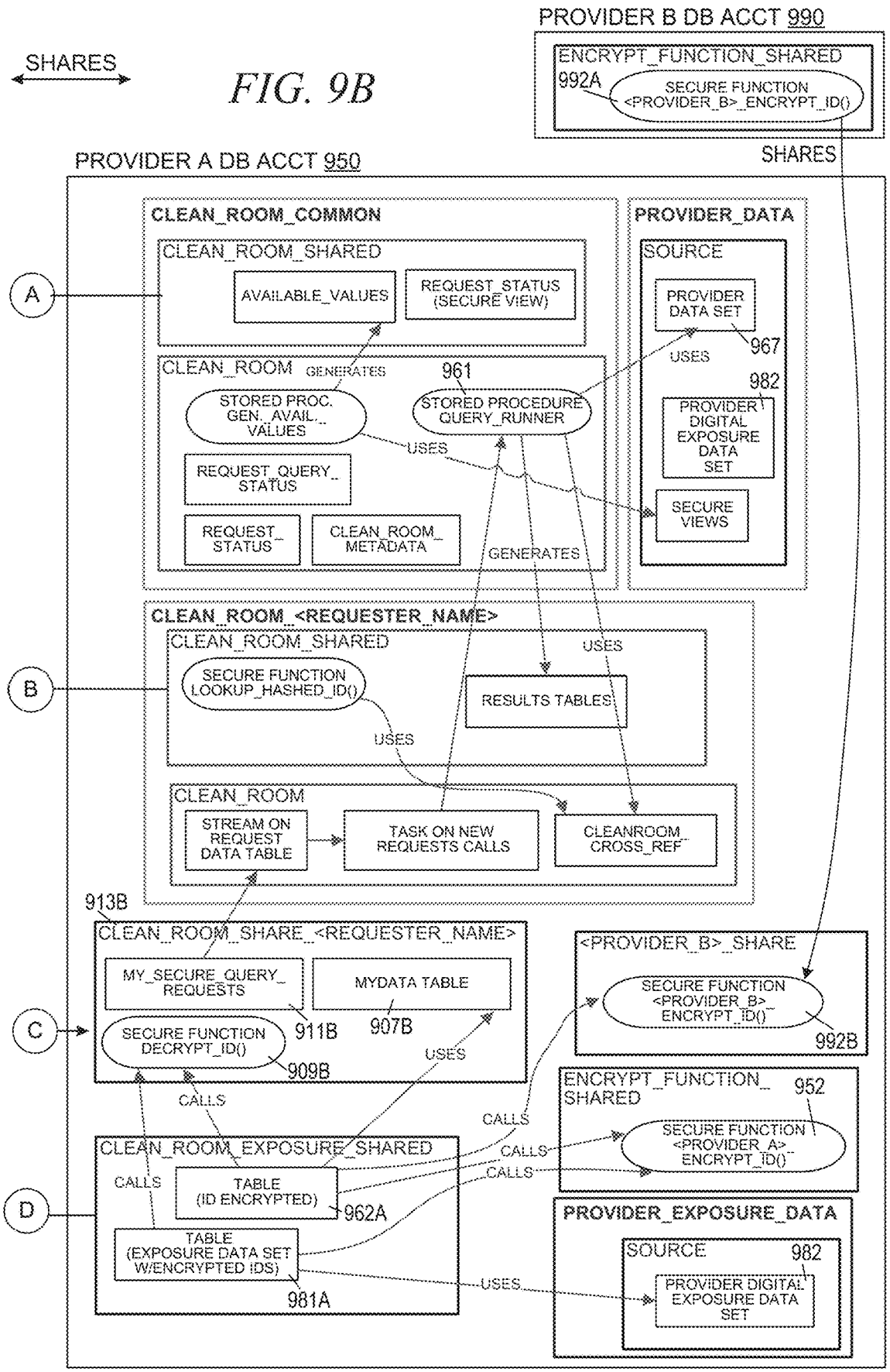

FIGS. 9A and 9B show an example distributed database architecture for implementing multi-entity database clean rooms (e.g., three or more different accounts of different organizations or users of the network-based database system 102, FIG. 1), according to some example embodiments. As illustrated., a Requester Database Account 905 (FIG. 9A) shares data with a Provider A Database Account 950 (FIG. 9B) and Provider B Database Account 990 (FIG. 9B), as indicated by the double-side share arrows at the top of FIGS. 9A and 9B. Further, the "A" "B", "C", and "D" arrows are disconnected arrows between items shared across FIGS. 9A and 9B. As an example, the Requester Database Account 905 is a media company that runs advertising campaigns (e.g., purchases ads) from multiple advertisers, each of which have different and independent distributed database accounts the network-based database system 102, as discussed above, with reference to FIGS. 1-3. As an example, Provider A Database Account 950 can include a first media streaming platform that provides advertisement services (e.g., ad space), and Provider B Database Account 990 can be another media streaming platform that similarly provides advertisement services. While database clean rooms can implement sharing between a single requester and single provider (discussed in the approaches above), implementing a secure data clean room that enables the requester access to advertisement results data (e.g., ad metrics and performance) from multiple different provider advertisers can be difficult to implement in a. secure manner (e.g., without exposing the data of Provider A Database Account 950 to Provider B Database Account 990, and vice versa). As an additional example, the Requester Database Account 905 can be a product company (e.g., product company that is purchasing ad space for different products or services), the Provider A Database Account 950 can be a streaming platform that provides advertisement services (e.g., displays the ads on a network site), and Provider B Database Account 990 can be a brick-and-mortar store that physically sells advertised products of the Requester Database Account 905. In this example, it can be difficult to track conversion from purchased ads that were displayed to end-users (e.g., users that view a given ad) to those end-users later purchasing the product (e.g., in the brick-and-mortar store) due to the computational difficulties of securely sharing the data from different providers and the requester.

To this end, the clean room engine 225 implements an encryption-based database clean room that can share data between multiple entities (e.g., three or more entities or accounts of the network-based database system 102), including a Requester Database Account 905 and multiple provider accounts (e.g., Provider A Database Account 950, Provider B Database Account 990), where user data (e.g., user IDs of the end-users of the different accounts) is provided and securely shared via one or more encryption mechanisms, and the Requester Database Account 905 can perform verification and analysis of the data from the different providers entirely on the database account instance of the requester (e.g., on database storage devices and compute instances of the Requester Database Account 905 of the network-based database system 102), in accordance with some example embodiments.

With reference to FIG. 9B, the Provider A Database Account 950 creates a Provider_A User ID Encryption Secure Function 952 which is a shareable secure function that can be shared with the Requester Database Account 905, which is encrypted by an encryption function of the Provider A Database Account 950 (e.g., with keys that are private to that provider).

The Provider B Database Account 990 generates a similar function: Provider_B User ID Encryption Secure Function 992A, which is encrypted by an encryption function of the Provider B Database Account 990 (e.g., with keys that are private to the Provider B Database Account 990). The Provider_B User ID Encryption Secure Function 992A is then shared from the Provider B Database Account 990 to the Provider A Database Account 950 as Provider_B User ID Encryption Secure Function 992B, which can be used to wrap functions and which can be called in execution to generate results data (e.g., shared with the Requester Database Account 905 and executed to provide end-user ID direct matching, without exposing the secure function's data to the Requester Database Account 905), in accordance with some example embodiments.

With reference to FIG. 9A, the Requester Database Account 905 generates a My Data Table 907A which is the input data from the Requester Database Account 905 that is to be used for completing multi-entity data clean room queries that are generated by the requester. Further, the Requester Database Account 905 generates a Decrypt_ID Secure Function 909A which is configured to perform decryption of the encrypted IDs in the My Data Table 907A. In some example embodiments, the Decrypt_ID Secure Function 909A stores a private pass key of the Requester Database Account 905 (e.g., AES 256 decryption key, pass phrase) which can be initiated to decrypt the IDs (user IDs) that are included in the My Data Table 907A, according to some example embodiments.

To initiate a multi-entity encryption-secured data clean room query, the Requester Database Account 905 adds query data to the My Secure Query Requests Table 911A which is part of the clean room shared 913A which is shared with Provider A Database Account 950 (in FIG. 9B) as the shared clean room data 913B (shared object), which, as depicted, includes the My Secure Query Requests Table 911B, which further comprises the data of the newly added request. The newly added query request initiates streams and tasks to run a Stored Procedure Query Runner 961 in FIG. 9B, in accordance with some example embodiments.

To generate data for the received request, in response to the Stored Procedure Query Runner 961 running, the Provider A Database Account 950 begins by creating an ID Encrypted Table 962A by cycling through the My Data Table 907B (shared object) in micro batches. In some example embodiments, the micro batches are mixed or re-ordered so they are not included in the initial order such that are not identifiable in the ID Encrypted Table 962A.

The ID Encrypted Table 962A integrates the My Data Table 907B by wrapping the Secure Function Decrypt_ID 909B (shared object from the Requester Database Account 905) around the table of encrypted IDs in the My Data Table 907B (the shared object), and further wrapping the two encryption functions—Provider_B User ID Encryption Secure Function 992B, and the Provider_A User ID Encryption Secure Function 952—around the My Data Table 907B (which is already wrapped by Secure Function Decrypt_ID 909B), which results in triple encrypted data that uses the user IDs from the requester side as encrypted by the encryption functions of the providers. The triple encrypted object, ID Encrypted Table 962A, is then shared from the Provider A Database Account 950 to the Requester Database Account 905 as the ID Encrypted Table 962B (FIG. 9A), in accordance with some example embodiments.

The Provider A Database Account 950 (FIG. 9B) then creates a table of exposure data, encrypted exposure data table 981A, which is encrypted by encryption functions of the two providers (the Provider_B User ID Encryption Secure Function 992B and. Provider_A User ID Encryption Secure Function 952). The encrypted exposure data table 981A is created from the provider source data 982 (e.g., ad performance metrics, advertising exposure data set, reach and frequency data of different ads and users from provider data set 967), for those user IDs that match between the requester and providers (e.g., via direct matching without a cross reference table). The encrypted exposure data table 981A is shared with the Requester Database Account 905 as encrypted exposure data table 981B.

In some example embodiments, the encrypted exposure data table 981A is only encrypted by the Provider_B User ID Encryption Secure Function 992B and the Provider_A User ID Encryption. Secure Function. 952, not by the requester's function (Secure Function Decrypt_ID 909B). In some example embodiments to ensure that the data decrypts, the same ordering that is used to wrap the functions to create the ID Encrypted Table 962A (FIG. 9B) is used to create the encrypted exposure data table 981A (FIG. 9B). That is for example, if the Provider_B User ID Encryption Secure Function 992B is wrapped around the Provider_A User ID Encryption Secure Function 952, which is further wrapped around the Secure Function Decrypt_ID 909B (which further is wrapped around My Data Table 907B), then to create the encrypted exposure data table 981A, the provider source data 982 (e.g., ad exposure data) is wrapped by the Provider_B User ID Encryption Secure Function 992B and further by the Provider_A User ID Encryption Secure Function 952 to maintain the encryption order, such the data decrypts correctly when called by the query code of the Requester Database Account 905, in accordance with some example embodiments.

Once the Requester Database Account 905 receives the ID Encrypted Table 962B (e.g., receives shared access to the ID Encrypted Table 962A), and further receives the encrypted exposure data table 981B (e.g., receives shared access to the encrypted exposure data table 981A), the Requester Database Account 905 performs joins on the tables' data to initiate attribution modeling on the joined data using attribution modeling function 933 (e.g., machine learning, data modeling and analysis functions). That is, for example, the ID Encrypted Table 962B is the requester's user ID data (triple encrypted, as discussed), and the encrypted exposure data table 981B is the exposure data (e.g., Provider A's user data, such as ad performance) which includes the attributes and data values to enable the Requester Database Account 905 to perform reach and frequency analysis of the providers' services (e.g., ad services, product sales data) of the multiple providers. Although in the illustrated example of FIGS. 9A and 9B, a requester performs clean room analysis on two providers, it is appreciated that the number of providers can be scaled such that the requester can efficiently perform analysis on each provider with which the requester interacts (e.g., four provider accounts that provide ad space, one physical store provider account that sells products, and three online network retailers that sell the product(s)).

Figure 10:
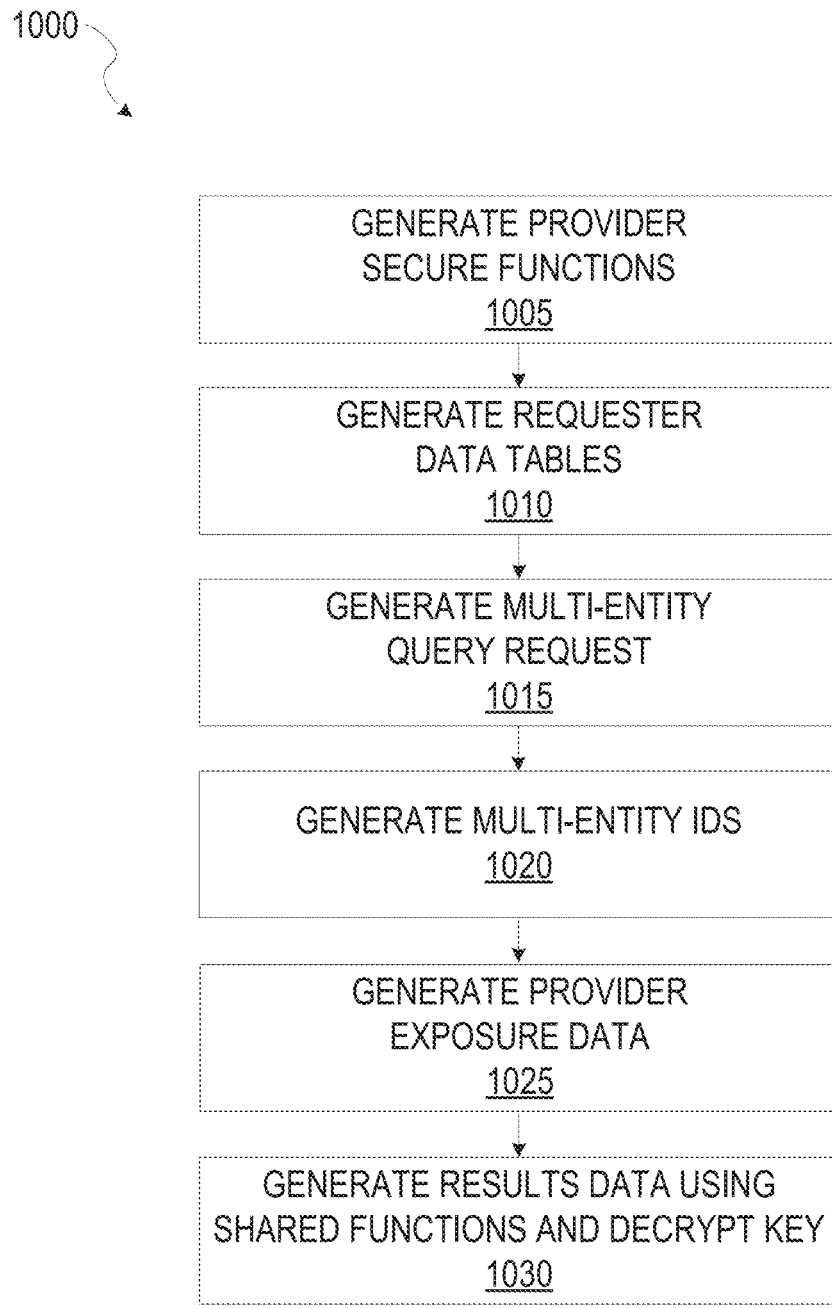
FIG. 10 shows a flow diagram of an example method for implementing a multi-entity encryption-based data clean room queries, according to some example embodiments.

FIG. 10 shows a flow diagram of an example method 1000 for implementing a multi-entity encryption-based data clean room queries, according to some example embodiments. At operation 1005, the secure functions of the provider accounts are generated (e.g., Provider_B User ID Encryption Secure Function 992B, from the Provider B Database Account 990; and the Provider_A User ID Encryption Secure Function 952, from Provider A Database Account 950). At operation 1010, the requester data tables are generated (e.g., My Data Table 907A, Decrypt_ID Secure Function 909A, and My Secure Query Requests Table 911A), which are shared with the Provider A Database Account 950 in FIG. 9B, as discussed above. At operation 1015, a multi-entity query request is generated. For example, the Requester Database Account 905 adds new query request data to the My Secure Query Requests Table 911A (FIG. 9A) which is shared with the Provider A Database Account 950 in the My Secure Query Requests Table 911B (FIG. 9B).

At operation 1020, multi-entity ID data is generated. For example, the Provider A Database Account 950 generates the ID Encrypted Table 962A by a wrapping the My Data Table 907B with the Secure Function Decrypt_ID 909B, which is then wrapped by Provider_B User ID Encryption Secure Function 992B, which is then further wrapped by the Provider_A User ID Encryption Secure Function 952. After the ID Encrypted Table 962A is generated by the Provider A Database Account 950, the ID Encrypted Table 962A is shared with the Requester Database Account 905 as the ID Encrypted Table 962B (in FIG. 9A).

At operation 1025, the provider data is generated. For example the Provider A Database Account 950 generates the encrypted exposure data table 981A by wrapping the exposure data set of the provider source data 982 using the Provider_B User ID Encryption Secure Function 992B and the Provider_A User ID Encryption Secure Function 952 (e.g., in the same order as was used to create the ID Encrypted Table 962A, albeit without first wrapping the data with the Secure Function Decrypt_ID 909B). Once generated, the encrypted exposure data table 981A is shared with the Requester Database Account 905 as the encrypted exposure data table 981B.

At operation 1030, the results data is generated. For example, the Requester Database Account 905 can perform joins on the ID Encrypted Table 962B and the encrypted exposure data table 981B, and an analysis function is applied to the joined data (e.g., attribution modeling function 933). In some example embodiments, the requester's user data is decrypted using the passkey within the Decrypt_ID Secure Function 909A, with the encryption functions of the providers, where direct matching can be implemented using the shared functions of the providers: Provider_B User ID Encryption Secure Function 992B and the Provider_A User ID Encryption Secure Function 952, which can access the respective providers user ID data behind the scenes, as secure function operations (UDFs) of the respective providers (respective sandbox processes), without exposing the function operations (and underlying data, such as exposure data) to the requester account that is executing the functions to generate to the results data.

Figure 11:
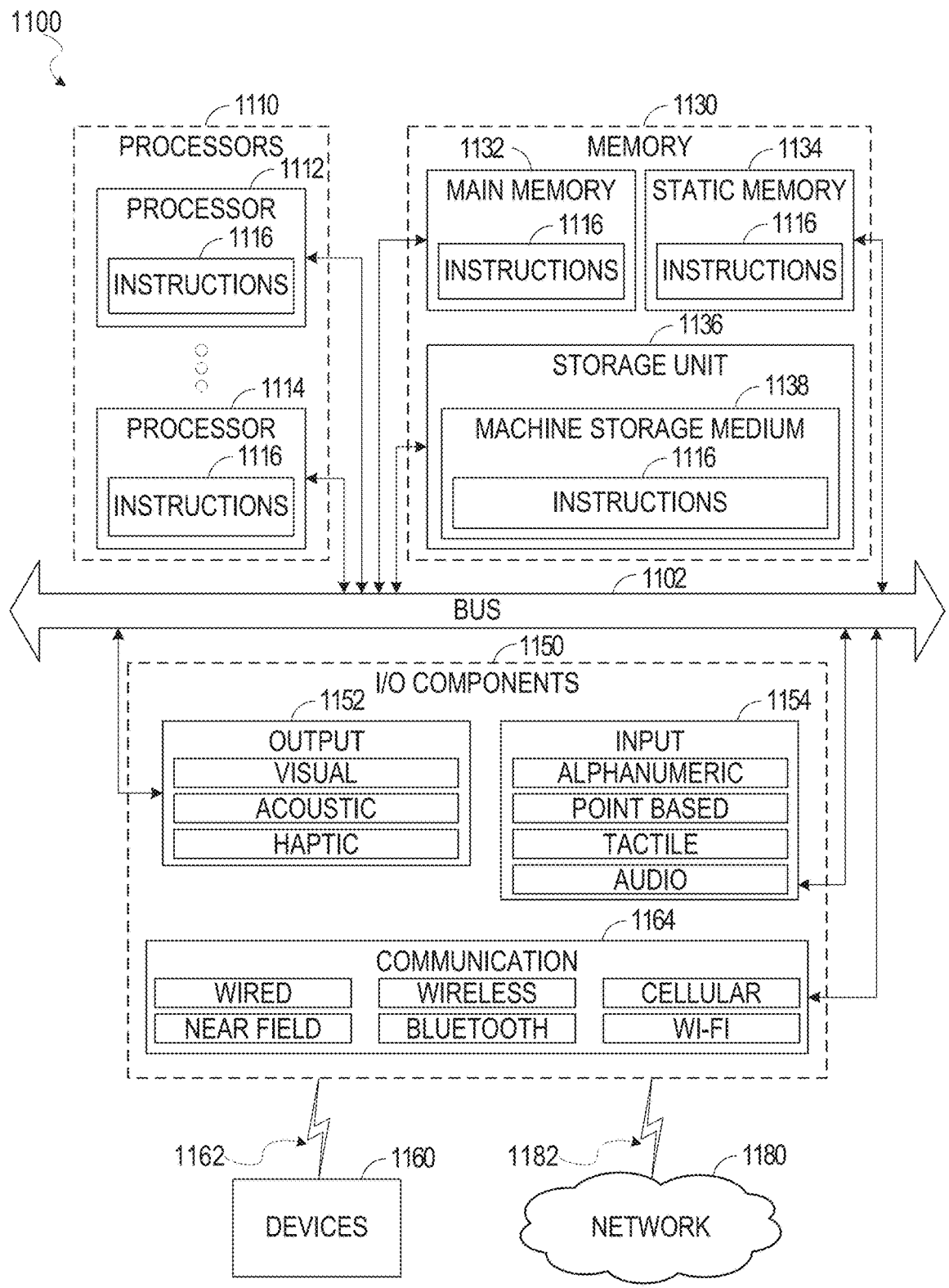
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of any one or more of the methods described herein. As another example, the instructions 1116 may cause the machine 1100 to implemented portions of the data flows described herein. In this way, the instructions 1116 transform a general, non-programmed machine into a particular machine 1100 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (AMC), another processor, or any suitable combination thereof) may include, for example, a processor 1112 and a processor 1114 that may execute the instructions 1116. The term. "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 comprising a machine storage medium 1138 may store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 via a coupler 1182 or to devices 1160 via a coupling 1162. For example, the communication components 1164 may include a network interface component or another suitable device to interface with the network 1180. in further examples, the communication components 1164 may include wired communication components, wireless communication components, cellular communication components, and other communication components to provide communication via other modalities. The devices 1160 may be another machine or any of a wide variety of peripheral devices (e.g., a peripheral device coupled via a universal serial bus (USB)). For example, as noted above, the machine 1100 may correspond to any one of the remote computing device 106, the access management system 110, the compute service manager 112, the execution platform 114, the access management system 118, the Web proxy 120, and the devices 1160 may include any other of these systems and devices.

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network. (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term. Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1162 (e.g., a peer-to-peer coupling) to the devices 1160. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: generating, by a requester database account of a distributed database, a clean room query request against a shared data set comprising requester data set from the requester database account and a provider data set from a provider database account of the distributed database, the requester database account not having access through the distributed database to the provider data set in plain text format, the provider database account not having access through the distributed database to the requester data set in plain text format, generating, by the requester database account, a requester shared data table comprising the requester data set in encrypted format that is encrypted using a pass phrase that is private to the requester database account; generating, by the provider database account, a user defined function that generates results data using the requester shared data table in the encrypted format and the provider data set, wherein the user defined function accepting a decryption parameter to generate the results data by decrypting the requester data set; generating, by the requester database account, the results data for the clean room query request by inputting, by the requester database account, the pass phrase into the user defined function and executing the user defined function.

Example 2. The method of example 1, wherein the requester database account executes the user defined function and the user defined function executes on a provider database instance of the provider database account on the distributed database.

Example 3. The method of examples 1 or 2, further comprising: sharing the requester data set in the encrypted format with the provider database account as a shared database object of the distributed database.

Example 4. The method of examples 1-3, further comprising: sharing, by the provider database account, the user defined function with the requester database account.

Example 5. The method of examples 1-4, wherein the user defined function generates the results data using metadata references to the provider data set.

Example 6. The method of examples 1-5, wherein the pass phrase is private to the requester database.

Example 7. The method of examples 1-6, wherein the provider database account cannot generate the results data by executing the user defined function without inputting the pass phrase due to the requester data set being in the encrypted format.

Example 8. The method of examples 1-7, further comprising: storing, by the provider database account, available values table that specifies which portions of the provider data set are accessible to the requester database account via the clean room query request.

Example 9. The method of examples 1-8, wherein the clean room query request specifies portions of the provider data set for processing in the clean room query request.

Example 10. The method of examples 1-9, further comprising: determining whether the requester database account has access to the portions of the provider data set that are specified in the clean room query request, wherein the access is determined using the available values table of the provider database account.

Example 11. A system comprising: one or more processors of a machine; and a memory storing instructions that, when executed by the one or more processors, cause the machine to perform operations implementing any one of example methods 1 to 10.

Example 12. A machine-readable storage device embodying instructions that, when executed by a machine, cause the machine to perform operations implementing any one of example methods 1 to 10.

Example 13. A method comprising: generating, from a requestor database account of a distributed. database, a query against user data shared by multiple provider database accounts including a first provider database account and a second. provider database account, the requestor database account and the multiple provider database account not having access user data identifiers in plain text format through the distributed database; receiving, from a requestor database account of a distributed database, a user identifier table wrapped in a decryption function of the requestor database account and a first encryption function of the first provider database account and a second encryption function of a second provider database account; receiving, from the requestor database account, a provider user data set of the first provider database account, the provider user data set being wrapped in the first encryption function of the first provider database account and the second encryption function of the second provider database account; and generating, from the requestor database account, results data using the first provider user data set and the user identifier table.

Example 14. The method of example 13, wherein the user identifier table and the provider user data set are wrapped in a same order by the first encryption function of the first provider database account and the second encryption function of the second provider database account.

Example 15. A system comprising: one or more processors of a machine; and a memory storing instructions that, when executed by the one or more processors, cause the machine to perform operations implementing any one of example methods 13 or 14.

Example 16. A machine-readable storage device embodying instructions that, when executed by a machine, cause the machine to perform operations implementing any one of example methods 13 or 14.

What is claimed is:

1. A computer implemented method comprising:
generating, by a requester account, requester data of a request for a data set from a secured database of a database system;
generating, by a provider account, shared tables of the data set for use in a clean room query based on the requester data, the shared tables encrypted by the provider account using an encryption function of the requester account with a pass phrase that is private to the requester account, the shared tables being processed in micro-batches, the micro-batches being mixed and re-ordered from an initial sequence;
generating, by the requester account, a clean room request for the data set;
generating, by the provider account, a shared secure user defined table function that accepts the pass phrase as a decryption key parameter, the pass phrase being passed to the shared secure user defined table function by the requester account;
generating, by the request account, results data by passing the pass phrase to the shared secure user defined table function;
decrypting, by the shared secure user defined table function using the pass phrase, the requester data;

matching, by the secure user defined table function, the requester data to user identifiers in the data set that are accessed using metadata references without exposing the user identifiers to the requester; and displaying the results data based on the matching.

2. The method of claim 1, wherein the data set comprises an available values table comprising data tables that are accessible by the requester account through a query.

3. The method of claim 2, wherein the data table comprise data used as filters in the clean room query.

4. The method of claim 1, wherein the requester data comprises a pre-filter for the results data.

5. The method of claim 1, wherein the requester data includes a column filter parameter specifying data fields from the requester account and the provider account.

6. The method of claim 1, further comprising:

validating, by the provider account, the requester data against a available values table of the provider account.

7. The method of claim 6, wherein the secure user defined table function executes in a sandbox process of the database system.

8. A computing apparatus comprising:

a processor; and a memory storing instructions that, when executed by the processor, configure the apparatus to perform operations comprising:

generating, by a requester account, requester data of a request for a data set from a secured database of a database system;

generating, by a provider account, shared tables of the data set for use in a clean room query based on the requester data, the shared tables encrypted by the provider account using an encryption function of the requester account with a pass phrase that is private to the requester account, the shared tables being processed in micro-batches, the micro-batches being mixed and re-ordered from an initial sequence;

generating, by the requester account, a clean room request for the data set;

generating, by the provider account, a shared secure user defined table function that accepts the pass phrase as a decryption key parameter, the pass phrase passed to the shared secure user defined table function by the requester account;

generating, by the request account, results data by passing the pass phrase to the shared secure user defined table function;

decrypting, by the shared secure user defined table function using the pass phrase, the requester data;

matching, by the secure user defined table function, the requester data to user identifiers in the data set that are accessed using metadata references without exposing the user identifiers to the requester; and displaying the results data based on the matching.

9. The computing apparatus of claim 8, wherein the data set comprises an available values table comprising data tables that are accessible by the requester account through a query.

10. The computing apparatus of claim 9, wherein the data table comprise data used as filters in the clean room query.

11. The computing apparatus of claim 8, wherein the requester data comprises a pre-filter for the results data.

12. The computing apparatus of claim 8, wherein the requester data includes a column filter parameter specify data fields from the requester account and the provider account.

13. The computing apparatus of claim 8, wherein the instructions further configure the apparatus to perform operations comprising:

validating, by the provider account, the requester data against a available values table of the provider account.

14. The computing apparatus of claim 13, wherein the secure user defined table function executes in a sandbox process of the database system.

15. A non-transitory computer-readable storage medium, the computer-readable storage medium including instructions that when executed by a computer, cause the computer to perform operations comprising:

generating, by a requester account, requester data of a request for a data set from a secured database of a database system;

generating, by a provider account, shared tables of the data set for use in a clean room query based on the requester data, the shared tables encrypted by the provider account using an encryption function of the requester account with a pass phrase that is private to the requester account, the shared tables being processed in micro-batches, the micro-batches being mixed and re-ordered from an initial sequence;

generating, by the requester account, a clean room request for the data set;

generating, by the provider account, a shared secure user defined table function that accepts the pass phrase as a decryption key parameter, the pass phrase passed to the shared secure user defined table function by the requester account;

generating, by the request account, results data by passing the pass phrase to the shared secure user defined table function;

decrypting, by the shared secure user defined table function using the pass phrase, the requester data;

matching, by the secure user defined table function, the requester data to user identifiers in the data set that are accessed using metadata references without exposing the user identifiers to the requester; and displaying the results data based on the match.

16. The computer-readable storage medium of claim 15, wherein the data set comprises an available values table comprising data tables that are accessible by the requester account through a query.

17. The computer-readable storage medium of claim 16, wherein the data table comprise data used as filters in the clean room query.

18. The computer-readable storage medium of claim 15, wherein the requester data comprises a pre-filter for the results data.

19. The computer-readable storage medium of claim 15, wherein the requester data includes a column filter parameter specify data fields from the requester account and the provider account.

20. The computer-readable storage medium of claim 15, wherein the instructions further configure the computer to:

validate, by the provider account, the requester data against a available values table of the provider account.

21. The computer-readable storage medium of claim 20, wherein the secure user defined table function executes in a sandbox process of the database system.

* * * * *